United States Patent [19]

Akiyama et al.

[11] Patent Number: 4,946,918

[45] Date of Patent: Aug. 7, 1990

[54] SYNTHETIC RESIN COMPATIBILIZER

[75] Inventors: Saburo Akiyama; Susumu Honda; Shin-ichi Akimoto, all of Tokyo; Tohru Yasukohchi, Kanagawa, all of Japan

[73] Assignee: Nippon Oil and Fats Co., Ltd., Tokyo, Japan

[21] Appl. No.: 266,764

[22] Filed: Nov. 3, 1988

[30] Foreign Application Priority Data

Nov. 6, 1987 [JP] Japan ............................ 62-279300

[51] Int. Cl.⁵ .......................................... C08F 122/04
[52] U.S. Cl. .................................. 526/271; 526/318.3
[58] Field of Search .............................. 526/271, 318.3

[56] References Cited

U.S. PATENT DOCUMENTS 2,892,820 6/1959 Stewart et al. ...................... 526/271

Primary Examiner—Joseph L. Schofer
Assistant Examiner—Alex H. Walker
Attorney, Agent, or Firm—Sughrue, Mion, Zinn, Macpeak & Seas

[57] ABSTRACT

A synthetic resin compatibilizer comprising a copolymer of a polyoxyalkylene derivative represented by general formula(I) with maleic anhydride, maleic acid, or a salt or an ester thereof

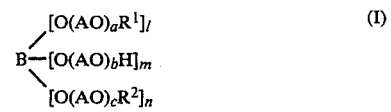

where B represents a residue of a compound having from 2 to 8 hydroxyl groups; AO represents an oxyalkylene group having from 2 to 18 carbon atoms; $R^1$ represents an unsaturated hydrocarbon group having from 2 to 5 carbon atoms; $R^2$ represents a hydrocarbon or acyl group having from 1 to 40 carbon atoms; a is from 0 to 1,000; b is from 0 to 1,000; c is from 0 to 1,000; l is from 1 to 8; m is from 0 to 2; and n is from 0 to 7; $l+m+n=2$ to 8; $al+bm+cn=1$ to 1,000, and $m/(l+n) \leq \frac{1}{3}$.

The synthetic resin compatibilizer provides a polymer alloy having excellent tensile and flexural strengths.

6 Claims, No Drawings

SYNTHETIC RESIN COMPATIBILIZER

FIELD OF THE INVENTION

The present invention relates to a synthetic resin compatibilizer. More particularly, it relates to a synthetic resin compatibilizer which is added to two or more synthetic resins which lack compatibility with each other to render these resins compatibility with each other, and to thereby obtain a polymer alloy having excellent physical properties.

BACKGROUND OF THE INVENTION

Many attempts have been made to obtain synthetic resins having excellent physical properties by blending synthetic resins of different properties and eliminating drawbacks of the respective synthetic resins.

Synthetic resins having different properties, however, lack compatibility, while it is often impossible to obtain excellent physical properties by blending compatible synthetic resins.

For the compatibilization of synthetic resins which lack compatibility, there are many methods including use of a compatibilizer, use of a random copolymer, use of pressure effect, etc. Methods utilizing compatibilizers use styrenic resins containing epoxy groups disclosed in JP-A-60-221459 and JP-A-61-293260. (the term "JP-A" as used herein means an "unexamined published Japanese patent application").

In many cases, however, even these compatibilizing means produce insufficient results, and therefore, there has been a demand for a better means for compatibilization.

SUMMARY OF THE INVENTION

It is an object of the present invention to provide a synthetic resin compatibilizer useful for rendering incompatible synthetic resins compatible with each other.

As a result of extensive studies to solve the problems, the present inventors have achieved the present invention based on the finding that an excellent compatibilizing effect on various synthetic resins is obtainable by using as a synthetic resin compatibilizer a copolymer of a specific copolymerizable polyoxyalkylene derivative with maleic anhydride, maleic acid, a salt or an ester thereof.

According to the present invention, there is provided a synthetic resin compatibilizer comprising a copolymer of a polyoxyalkylene derivative represented by general formula(I) with maleic anhydride, maleic acid, or a salt or an ester thereof

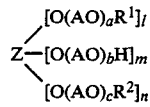
(I)

where Z represents a residue of a compound having from 2 to 8 hydroxyl groups; AO represents an oxyalkylene group having from 2 to 18 carbon atoms; $R^1$ represents an unsaturated hydrocarbon group having from 2 to 5 carbon atoms; $R^2$ represents a hydrocarbon or acyl group having from 1 to 40 carbon atoms; a is from 0 to 1,000; b is from 0 to 1,000; c is from 0 to 1,000; l is from 1 to 8; m is from 0 to 2; and n is from 0 to 7; $l+m+n=2$ to 8; $al+bm+cn=1$ to 1,000, and $m/(l+n) \leq \frac{1}{3}$.

DETAILED DESCRIPTION OF THE INVENTION

In formula (I) described above, examples of the compound containing Z as a residue and having from 2 to 8 hydroxy groups, include polyhydric phenols such as catechol, resorcin, hydroquinone, and phloroglucin; polyhydric alcohols such as ethylene glycol, propylene glycol, butylene glycol, dodecylene glycol, octadecylene glycol, neopentyl glycol, styrene glycol, glycerol, diglycerol, polyglycerol, trimethylolethane, trimethylolpropane, 1,3,5-pentanetriol, erythritol, pentaerythritol, dipentaerythritol, sorbitol, sorbitan, sorbide, a sorbitol-glycerol condensate, adonitol, arabitol, xylitol, and mannitol; saccharides such as xylose, arabinose, ribose, rhamnose, glucose, fructose, galactose, mannose, sorbose, cellobiose, maltose, isomaltose, trehalose, sucrose, raffinose, gentianose, and melezitose; and the partially etherified or partially esterified compounds thereof.

Examples of the oxyalkylene group having from 2 to 18 carbon atoms shown by AO in formula (I) include an oxyethylene group, an oxypropylene group, an oxybutylene group, an oxytetramethylene group, an oxystyrene group, an oxydodecylene group, an oxytetradecylene group, an oxyhexadecylene group, and an oxyoctadecylene group; the oxyalkylene group may be an adduct of one of these groups or an adduct of two or more of these groups. With adducts of two or more of these groups, they may be random or block adducts.

As the unsaturated hydrocarbon group having from 2 to 5 carbon atoms represented by $R^1$ may be mentioned hydrocarbon groups terminated by an unsaturated double bond such as a vinyl group, an allyl group, a methallyl group, a 3-butenyl group, a 4-pentenyl group, and a 3-methyl-3-butenyl group.

As the hydrocarbon group having from 1 to 40 carbon atoms represented by $R^2$ may be mentioned a methyl group, an ethyl group, a propyl group, an isopropyl group, a butyl group, an isobutyl group, a tert-butyl group, an amyl group, an isoamyl group, a hexyl group, a heptyl group, a 2-ethylhexyl group, an octyl group, a nonyl group, a decyl group, an undecyl group, a dodecyl group, an isotridecyl group, a tetradecyl group, a hexadecyl group, an isohexadecyl group, an octadecyl group, an isooctadecyl group, an oleyl group, an octyldodecyl group, a docosyl group, a decyltetradecyl group, a benzyl group, a cresyl group, a butylphenyl group, a dibutylphenyl group, an octylphenyl group, a nonylphenyl group, a dodecylphenyl group, a dioctylphenyl group, a dinonylphenyl group, a styrenated phenyl group, and a naphthyl group; the acyl group represented by $R^2$ may be that derived from acetic acid, propionic acid, butyric acid, isobutyric acid, caproic acid, caprylic acid, 2ethylhexanoic acid, pelargonic acid, capric acid, lauric acid, myristic acid, palmitic acid, isopalmitic acid, margaric acid, stearic acid, isostearic acid, arachic acid, behenic acid, palmitoleic acid, oleic acid, linoleic acid, linolenic acid, erucic acid, and benzoic acid.

As the salt of maleic acid salt may be mentioned an ammonium salt; monoamine salts such as a methylamine salt, an ethylamine salt, a propylamine salt, a butylamine salt, a hexylamine salt, an octylamine salt, a 2-ethylhexylamine salt, a nonylamine salt, a decylamine salt, a dodecylamine salt, an isotridecylamine salt, a tetradecylamine salt, a hexadecylamine salt, an isohexadecylamine salt, an octadecylamine salt, an isooctadecylamine salt, an oleylamine salt, a linolamine salt, an octyldodecylamine salt, a dococylamine salt, and a decyltetradecylamine salt, and an aniline salt; polyamine salts such as an ethylenediamine salt, a tetramethylenediamine salt, a dodecylpropylenediamine salt, an octadecylpropylenediamine salt, an oleylpropylenediamine salt, a diethylenetriamine salt, a triethylenetetramine salt, a tetraethylenepentamine salt, and a pentaethylenehexamine salt; alkanolamine salts such as a monoethanolamine salt, a diethanolamine salt, a triethanolamine salt, a monoisopropanolamine salt, a diisopropanolamine salt, a triisopropanolamine salt, and salts of the alkylene oxide addition products of mono- or diamines; and amino acid salts such as a lysine salt, and an arginine salt; alkali metal salts such as a lithium salt, a sodium salt, and potassium salt; and alkaline earth metal salts such as a magnesium salt, and a calcium salt.

As the maleic acid ester may be mentioned esters with alcohols such as methanol, ethanol, allyl alcohol, methallyl alcohol, propanol, isopropanol, butanol, isobutanol, tert-butanol, pentanol, isopentanol, hexanol, heptanol, 2-ethylhexanol, octanol, nonanol, decanol, undecanol, dodecanol, isotridecanol, tetradecanol, hexadecanol, isohexadecanol, octadecanol, isooctadecanol, oleyl alcohol, octyldodecanol, docosanol, decyltetradecanol, etc.

The copolymer used in the present invention can be obtained by copolymerizing the compound represented by general formula (I) with maleic anhydride, maleic acid, a salt of maleic acid or an ester of maleic acid by use of a radical catalyst. Also, the copolymer with maleic acid, or a salt or an ester thereof is obtained through esterification, hydrolysis and subsequent neutralization of a copolymer of maleic anhydride.

In the copolymerization of the compound represented by general formula (I) with maleic anhydride, maleic acid, a salt of maleic acid or an ester of maleic acid, there may be added copolymerizable monomers such as styrene, ethylene, propylene, butylene, isobutylene, di-isobutylene, octene, dodecene, and vinyl acetate. However, the preferred content of the compound of general formula (I) is from 10 to 70 mole%. The preferred weight average molecular weight of the copolymer is from 1,000 to 200,000.

When in general formula (I) is 1, a linear copolymer is formed, while, if l is 2 or larger, a crosslinked copolymer is formed. With regard to the relationship among l, m and n, no preferred copolymer is obtained when $m/(l+n)$ is larger than $\frac{1}{3}$.

With the copolymer used in the present invention, it is possible to vary the hydrophilic-hydrophobic balance by varying B, AO, $R^1$, $R^2$, a, b, c, l, m and n so that the most suitable is chosen depending on the kind of the synthetic resins to be compatibilized.

Examples of the synthetic resins that can be compatibilized by the synthetic resin compatibilizer of the present invention include polyamides such as Nylon 6, Nylon 6,6, Nylon 12, and polyphenylene terephthalamide, polyesters such as polyethylene terephthalate, polybutylene terephthalate, and polyarylate, polyolefins such as polyethylene, and polypropylene, polycarbonate, polyacetal, polyphenylene oxide, polyimide, polystyrene, acrylonitrile-styrene copolymer, acrylonitrile-butadienestyrene terpolymer, polyvinyl chloride, polyvinylidene chloride, polyvinyl acetate, polymethylmethacrylate, polyethylacrylate, a phenolic resin, a melamine resin, a diallyl phthalate resin, a polyurethane resin, a silicone resin, an epoxy resin, and a fluororesin.

The method of compatibilization is not limited, and one example is the mechanical blending by use of a kneading machine.

The amount used of the synthetic resin compatibilizer of the present invention is preferably from 2 to 30% by weight based on the total weight of the synthetic resin and the synthetic resin compatibilizer. Where the amount is less than 2% by weight, the compatibilization is insufficient, whereas the amount in excess of 30% by weight impairs the physical properties of the resin to be compatibilized.

When blending synthetic resins by use of the synthetic resin compatibilizer of the present invention, there may be added additives such as an antioxidant, an antistatic agent, a flame retardant, an ultraviolet absorber, a pigment, an inorganic filler and fiber.

By use of the synthetic resin compatibilizer of the present invention, it is possible to improve the compatibility between various resins and to thereby obtain a uniform blend. And, the resultant blend is excellence in physical properties such as mechanical and thermal properties.

The present invention is described in further detail by way of the following examples and comparative examples, but is not to be construed as being limited thereto. All parts and percentages in the amounts used are by weight.

EXAMPLES 1 to 13

5 parts of each of the synthetic resin compatibilizers of the present invention shown in Table 1, 47.5 parts of Nylon 6 and 47.5 parts of polycarbonate were dissolved in 400 parts of meta-cresol. The solution was dropped into a large volume of ethanol. The resultant precipitate was filtered off and the solvents was removed therefrom at 80° C. and 30 mm Hg. The resultant synthetic resin blend was subjected to the differential scanning calorimetric analysis to obtain the glass transition temperature and the melting points, which are given in Table 2.

COMPARATIVE EXAMPLE 1

The same operation as in Example 1 was repeated except that 50 parts of Nylon 6 and 50 parts of polycarbonate were dissolved in 400 parts of meta-cresol. The glass transition temperatures and the melting points measured are given in Table 2.

TABLE 1

| Synthatic Resin Compatibilizer | Compound of General Formula (I) | | Maleic anhydride (mole) | Co-monomer (mole) | Salt (mole) | Ester (mole) | Weight average molecular weight |
|---|---|---|---|---|---|---|---|
| | Structureal Formula | Amount Used (mole) | | | | | |
| No. 1 | $CH_2=CHCH_2O(C_2H_4O)_9CH_3$ | 1.0 | 1.0 | — | — | — | 50,000 |
| No. 2 | $CH_2=CHCH_2O(C_2H_4O)_{33}CH_3$ | 1.0 | 1.0 | — | — | — | 30,000 |
| No. 3 | $CH_2=CHCH_2O(C_2H_4O)_{120}CH_3$ | 1.0 | 1.0 | — | — | — | 40,000 |
| No. 4 | $CH_2=CHCH_2O(C_2H_4O)_7C_{18}H_{37}$ | 1.0 | 1.0 | — | — | — | 35,000 |

TABLE 1-continued

| Synthatic Resin Compatibilizer | Compound of General Formula (I) Structureal Formula | Amount Used (mole) | Maleic anhydride (mole) | Co-monomer (mole) | Salt (mole) | Ester (mole) | Weight average molecular weight |
|---|---|---|---|---|---|---|---|
| No. 5 | $CH_2=\overset{CH_3}{\underset{|}{C}}CH_2O(C_2H_4O)_3CH_3$ | 1.0 | 1.0 | — | — | — | 250,000 |
| No. 6 | $CH_2=CHCH_2O(C_2H_4O)_2C_{18}H_{37}$ | 1.0 | 1.0 | — | — | — | 70,000 |
| No. 7 | $CH_2=CHCH_2O(C_3H_6O)_{14}C_4H_9$ | 0.8 | 1.0 | styrene 0.2 | — | — | 30,000 |
| No. 8 | $CH_2=CHCH_2O(C_2H_4O)_8(C_3H_6O)_2CH_3$ $CH_2=CHCH_2O(C_2H_4O)_9CH_2CH=CH_2$ | 0.8 0.2 | 1.0 | — | — | — | 300,000 |
| No. 9 | $CH_2=CHCH_2O(C_3H_6O)_{51}CH_2CH=CH_2$ | 0.5 | 1.0 | — | — | — | above 300,000 |
| No. 10 | $H_2CO(C_2H_4O)_5CH_2\overset{CH_3}{\underset{|}{C}}=CH_2$ $HCO(C_2H_4O)_5H$ $HCO(C_2H_4O)_5COC_{17}H_{35}$ $HCO(C_2H_4O)_5COC_{17}H_{35}$ $HCO(C_2H_4O)_5COC_{17}H_{35}$ $H_2CO(C_2H_4O)_5COC_{17}H_{35}$ | 1.0 | 1.0 | — | — | — | 70,000 |
| No. 11 | $H_2CO(C_2H_4O)_{55}CH_2CH=CH_2$ $HCO(C_2H_4O)_{55}CH_2CH=CH_2$ $H_2C$ $O$ $H_2C$ $HCO(C_2H_4O)_{55}CH_2CH=CH_2$ $H_2CO\ C_8H_{17}$ | 0.2 | 1.0 | — | — | — | 270,000 |
| No. 12[1] | $C_9H_{19}-C_6H_4-O(C_2H_4O)_{10}CH_2CH=CH_2$ $CH_2=CHCH_2O\{(C_4H_8O)_5(C_3H_6O)_5\}CH_3$ | 0.8 0.7 | 1.0 | diiso-butylene 0.3 | — | — | 30,000 |
| No. 13 | $CH_2=\overset{CH_3}{\underset{|}{C}}CH_2O(C_2H_4O)_3CH_3$ | 1.0 | 1.0 | — | — | ethanol 0.3 | 260,000 |
| No. 14 | $CH_2=CHCH_2O(C_3H_6O)_{14}C_4H_9$ | 0.8 | 1.0 | styrene 0.2 | — | butanol 0.5 | 35,000 |
| No. 15 | $CH_2=CHCH_2OC_2H_4OC_{18}H_{37}$ | 1.0 | 1.0 | — | triethanol-amine 0.3 | — | 80,000 |
| No. 16 | $CH_2=CHCH_2O(C_2H_4O)_9CH_3$ | 1.0 | 1.0 | — | NaOH 0.2 | — | 50,000 |

Notes:
[1] The unit in { } is a random addition product.

TABLE 2

| | Synthetic* Resin Compatibilizer | Glass Transition Temperature (°C.) Contributed by Nylon 6 | Glass Transition Temperature (°C.) Contributed by poly-carbonate | Melting Point (°C.) |
|---|---|---|---|---|
| Example 1 | No. 1 | 42 | 108 | 220 |
| Example 2 | No. 2 | 42 | 108 | 220 |
| Example 3 | No. 3 | 42 | 107 | 220 |
| Example 4 | No. 4 | 34 | 118 | 220 |
| Example 5 | No. 5 | 41 | 111 | 220 |
| Example 6 | No. 6 | 34 | 118 | 220 |
| Example 7 | No. 7 | 38 | 116 | 212 |
| Example 8 | No. 8 | 40 | 113 | 214 |
| Example 9 | No. 9 | 33 | 128 | 216 |
| Example 10 | No. 10 | 36 | 119 | 220 |
| Example 11 | No. 11 | 38 | 112 | 220 |
| Example 12 | No. 12 | 42 | 110 | 210 |
| Example 13 | No. 13 | 41 | 111 | 220 |
| Comparative Example 1 | None | 32 | 134 | 220 |

*Nos. 1 to 13 correspond to the same numbers under Synthetic Resin Compatibilizer in Table 1.

EXAMPLES 14 TO 26

The same operation as in Examples 1 to 13 was repeated except that 5 parts of each of the synthetic resin compatibilizers of the present invention as shown in Table 1, 47.5 parts of Nylon 12 and 47.5 parts of polycarbonate were dissolved in 400 parts of cresol to prepare, respectively, Examples 14 to 26. The glass temperatures and the melting points measured are given in Table 3.

COMPARATIVE EXAMPLE 2

The same operation as in Examples 1 was repeated except that 50 parts of Nylon 12 and 50 parts of polycarbonate were dissolved in 400 parts of cresol. The glass transition temperatures and the melting points measured are given in Table 3.

TABLE 3

| | Synthetic* *Resin Compatibilizer | Glass Transition Temperature (°C.) | | Melting Point (°C.) |
|---|---|---|---|---|
| | | Contributed by Nylon 12 | Contributed by polycarbonate | |
| Example 14 | No. 1 | 25 | 115 | 181 |
| Example 15 | No. 2 | 25 | 115 | 181 |
| Example 16 | No. 3 | 24 | 118 | 181 |
| Example 17 | No. 4 | 22 | 135 | 180 |
| Example 18 | No. 5 | 24 | 115 | 181 |
| Example 19 | No. 6 | 22 | 135 | 180 |
| Example 20 | No. 7 | 25 | 119 | 178 |
| Example 21 | No. 8 | 24 | 122 | 177 |
| Example 22 | No. 9 | 21 | 136 | 177 |
| Example 23 | No. 10 | 24 | 120 | 180 |
| Example 24 | No. 14 | 23 | 122 | 173 |
| Example 25 | No. 15 | 22 | 130 | 181 |
| Example 26 | No. 16 | 21 | 132 | 178 |
| Comparative Example 2 | None | 18 | 143 | 180 |

*Nos. 1 to 16 correspond to the same numbers under Synthetic reson Compatibilizer in Table 1.

The Tables 2 and 3 indicate that the glass transition temperatures contributed by Nylon 6 or Nylon 12 are higher and the glass transition temperatures contributed by polycarbonate are lower in the examples of the present invention than those in the comparative example. This fact indicates a higher degree of compatibilization in the examples of the present invention.

EXAMPLES 27 TO 31 AND COMPARATIVE EXAMPLE 3

5 parts of each of the synthetic resin compatibilizers of the present invention shown in Table 4, 47.5 parts of Nylon 6 (Amilan CM 1017 of Toray Industries, Inc.) and 47.5 parts of polycarbonate (Panlite L-1250 of Teijin Chemicals Ltd.) were kneaded in a single screw extruder to obtain pellets. The pellets were then molded by use of an injection molding machine into test pieces for measuring the tensile strength and flexural strength.

The size of the test piece for testing the tensile strength (JIS K 7113-81) was one prescribed as "Type I", while the size of the test piece for testing the flexural strength (JIS K 7203-82) was 127 mm×12.7 mm×3.2 mm. As shown in Table 4, the polymer alloy obtained are excellent in the tensile strength and flexural strength.

In comparative example 3, a similar test was conducted with the test piece prepared without using a synthetic resin compatibilizer, and it was impossible to obtain a molded test piece because Nylon 6 was incompatible with polycarbonate.

TABLE 4

| | Synthetic Resin* Compatibilizer | Tensile Strength (Kg/cm$^2$) | Flexural Strength (Kg/cm$^2$) |
|---|---|---|---|
| Example 27 | No. 1 | 720 | 970 |
| Example 28 | No. 2 | 780 | 990 |
| Example 29 | No. 3 | 780 | 1,020 |
| Example 30 | No. 5 | 690 | 920 |
| Example 31 | No. 12 | 710 | 960 |

*Nos. 1, 2, 3, 5, and 12 correspond to the same numbers under Synthetic Resin Compatibilizer in Table 1.

EXAMPLES 32 TO 36 AND COMPARATIVE EXAMPLE 4

The same operation as in Example 27 was repeated except that 5 parts of each of the synthetic resin compatibilizers of the present invention as shown in Table 5, 60 parts of Nylon 6 (Amilan CM1017 of Toray Industries, Inc.) and 35 parts of polymethylmethacrylate (Delpet 60N of Asahi Chemical Industry Co., Ltd.) were used to prepare the test pieces and to measure the tensile strength and flexural strength thereof, the results being shown in Table 5.

In comparative example 4 no synthetic resin compatibilizer was used.

The polymer alloys wherein the synthetic resin compatibilizers of the present invention were used, have higher tensile strength and flexural strength than those of the polymer alloys wherein no synthetic resin compatibilizer was used. This fact indicates that a good compatibility has been attained by use of the compatibilizers of the present invention.

TABLE 5

| | Synthetic Resin* Compatibilizer | Tensile Strength (Kg/cm$^2$) | Flexural Strength (Kg/cm$^2$) |
|---|---|---|---|
| Example 32 | No. 1 | 750 | 1,000 |
| Example 33 | No. 2 | 780 | 1,060 |
| Example 34 | No. 3 | 770 | 1,060 |
| Example 35 | No. 7 | 710 | 970 |
| Example 36 | No. 8 | 710 | 960 |
| Comparative Example 4 | none | 620 | 810 |

*Nos. 1, 2, 3, 7, and 8 correspond to the same numbers under Synthetic Resin Compatibilizer in Table 1.

EXAMPLES 37 to 44 AND COMPARATIVE EXAMPLES 5 to 8

The same operation as in Example 27 was repeated except that 5 parts of each of the synthetic resin compatiblizers of the present invention shown in Table 6, 47.5 parts of a synthetic resin A and 47.5 parts of a synthetic resin B shown in Table 6 were used to prepare the test pieces. The measurements were made for the tensile strength and flexural strength, the results being shown in Table 6.

In comparative examples 5 to 8 no synthetic resin compatibilizer was used.

The polymer alloys wherein synthetic resin compatibilizers of the present invention were used, have higher tensile strength and flexural strength than those of the polymer alloys wherein no synthetic resin compatibilizer was used. This fact indicates that a good compatibility has been attained by use of the compatibilizers of the present invention.

TABLE 6

| | Synthetic Resin Compatibilizer* | Synthetic Resin A | Synthetic Resin B | Tensile Strength (Kg/cm²) | Flexural Strength (Kg/cm²) |
|---|---|---|---|---|---|
| Example 37 | No. 2 | Nylon 6[1] | Modified Polyphenylene Oxide[2] | 670 | 980 |
| Example 38 | No. 7 | Nylon 6[1] | Modified Polyphenylene Oxide[2] | 630 | 880 |
| Comparative Example 5 | none | Nylon 6[1] | Modified Polyphenylene Oxide[2] | 520 | 800 |
| Example 39 | No. 2 | Polycarbonate[3] | ABS Resin [4] | 590 | 880 |
| Example 40 | No. 7 | Polycarbonate[3] | ABS Resin [4] | 560 | 820 |
| Comparative Example 6 | none | Polycarbonate[3] | ABS Resin [4] | 480 | 720 |
| Example 41 | No. 2 | Polycarbonate[3] | Polybutylene[5] Terephthalate | 620 | 890 |
| Example 42 | No. 7 | Polycarbonate[3] | Polybutylene[5] Terephthalate | 560 | 850 |
| Comparative Example 7 | none | Polycarbonate[3] | Polybutylene[5] Terephthalate | 420 | 660 |
| Example 43 | No. 2 | Nylon 6,6[6] | Polybutylene[5] Terephthalate | 690 | 990 |
| Example 44 | No. 7 | Nylon 6,6[6] | Polybutylene[5] Terephthalate | 660 | 920 |
| Comparative Example 8 | none | Nylon 6,6[6] | Polybutylene[5] Terephthalate | 510 | 820 |

Notes:
*Nos. 2 and 7 correspond to the same numbers under Synthetic Resin Compatibilizer in Table 1.
[1]Amilan CM1017 (Toray Industries, Inc.)
[2]Xyron 400H (Asahi Chemical Industry Co., Ltd.)
[3]Panlite L-1250 (Teijin Chemicals Ltd.)
[4]Denka ABS GR-1000 (Denki Kagaku Kogyo Kabushiki Kaisha)
[5]Novaur 5010 (Mitsubishi Kasei Corporation)
[6]Leona 1300S (Asahi Chemical Industry Co., Ltd.)

While the invention has been described in detail and with reference to specific embodiments thereof, it will be apparent to one skilled in the art that various changes and modifications can be made therein without departing from the spirit and scope thereof.

What is claimed is:

1. A synthetic resin compatibilizer comprising a copolymer of a compound represented by general formula (I) with maleic anhydride, maleic acid, or a salt or an ester of maleic acid

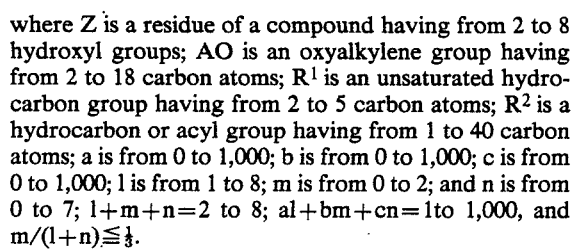

where Z is a residue of a compound having from 2 to 8 hydroxyl groups; AO is an oxyalkylene group having from 2 to 18 carbon atoms; $R^1$ is an unsaturated hydrocarbon group having from 2 to 5 carbon atoms; $R^2$ is a hydrocarbon or acyl group having from 1 to 40 carbon atoms; a is from 0 to 1,000; b is from 0 to 1,000; c is from 0 to 1,000; l is from 1 to 8; m is from 0 to 2; and n is from 0 to 7; $l+m+n=2$ to 8; $al+bm+cn=1$ to 1,000, and $m/(l+n) \leq \frac{1}{3}$.

2. The synthetic resin compatibilizer as in claim 1, wherein the copolymer comprises from 10 to 70 mole % of the compound represented by general formula (I).

3. The synthetic resin compatibilizer as in claim 1, wherein the copolymer has a weight average molecular weight of from 1,000 to 200,000.

4. A method for improving the compatibility of a blend of at least two synthetic resins selected from the group consisting of Nylon 6, Nylon 6,6, Nylon 12, polyphenylene terephthalamide, polyethylene terephthalate, polybutylene terephthalate, polyarylate, polyethylene, polypropylene, polycarbonate, polyacetal, polyphenylene oxide, polyimide, polystyrene, acrylonitrile-styrene copolymer, acrylonitrile-butadiene-styrene terpolymer, polyvinyl chloride, polyvinyl acetate, polymethylmethacrylate, polyethylacrylate, a phenolic resin, a melamine resin, a diallylphthalate resin, a urethane resin, a silicone resin, an epoxy resin and a fluororesin which comprises blending the compatibilizer of claim 1, in an amount effective to improve compatibility, with said at least 2 synthetic resins.

5. The method of claim 4, wherein the at least 2 synthetic resins are a combination selected form the group consisting of Nylon 6-polycarbonate, Nylon 12-polycarbonate, Nylon 6-polymethylmethacrylate, Nylon 6modified polyphenylene oxide, polycarbonate-ABS resin, polycarbonate-polybutylene terephthalate and Nylon 6,6-polybutylene terephthalate.

6. The synthetic resin compatibilizer as in claim 1, wherein the compound having from 2 to 8 hydroxyl groups is selected from the group consisting of polyhydric phenols, polyhydric alcohols, saccharides and the partially etherified or partially esterified compounds of said phenols, alcohols or saccharides.

* * * * *